No. 772,529. PATENTED OCT. 18, 1904.
W. P. McCAIN.
HARROW.
APPLICATION FILED MAR. 7, 1904.
NO MODEL. 2 SHEETS—SHEET 2.
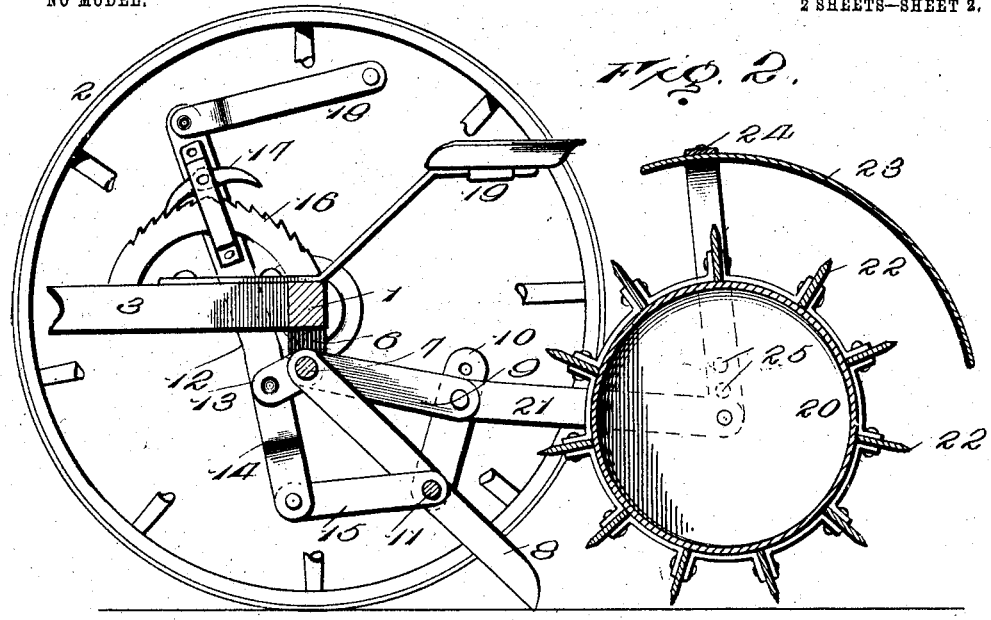
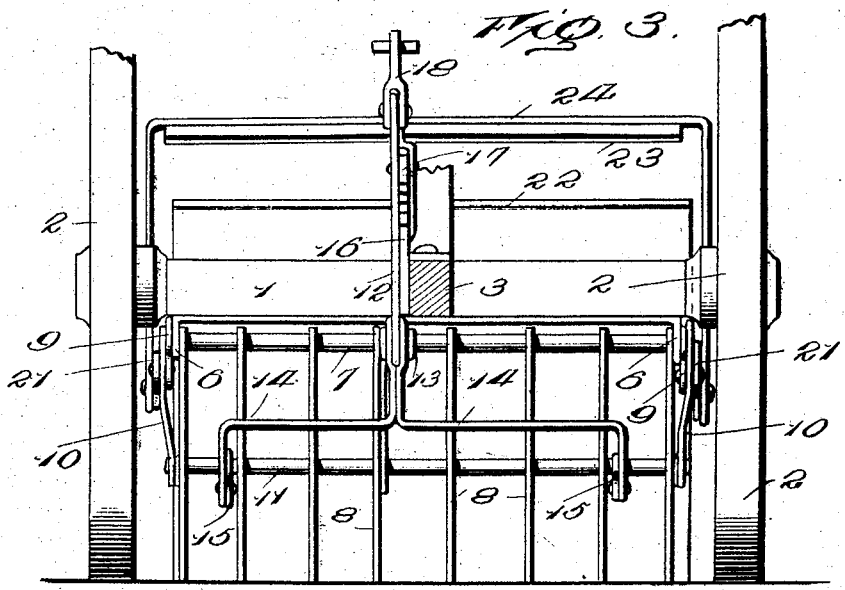
Inventor
W. P. McCain.
Witnesses
By
His Attorneys No. 772,529. Patented October 18, 1904.

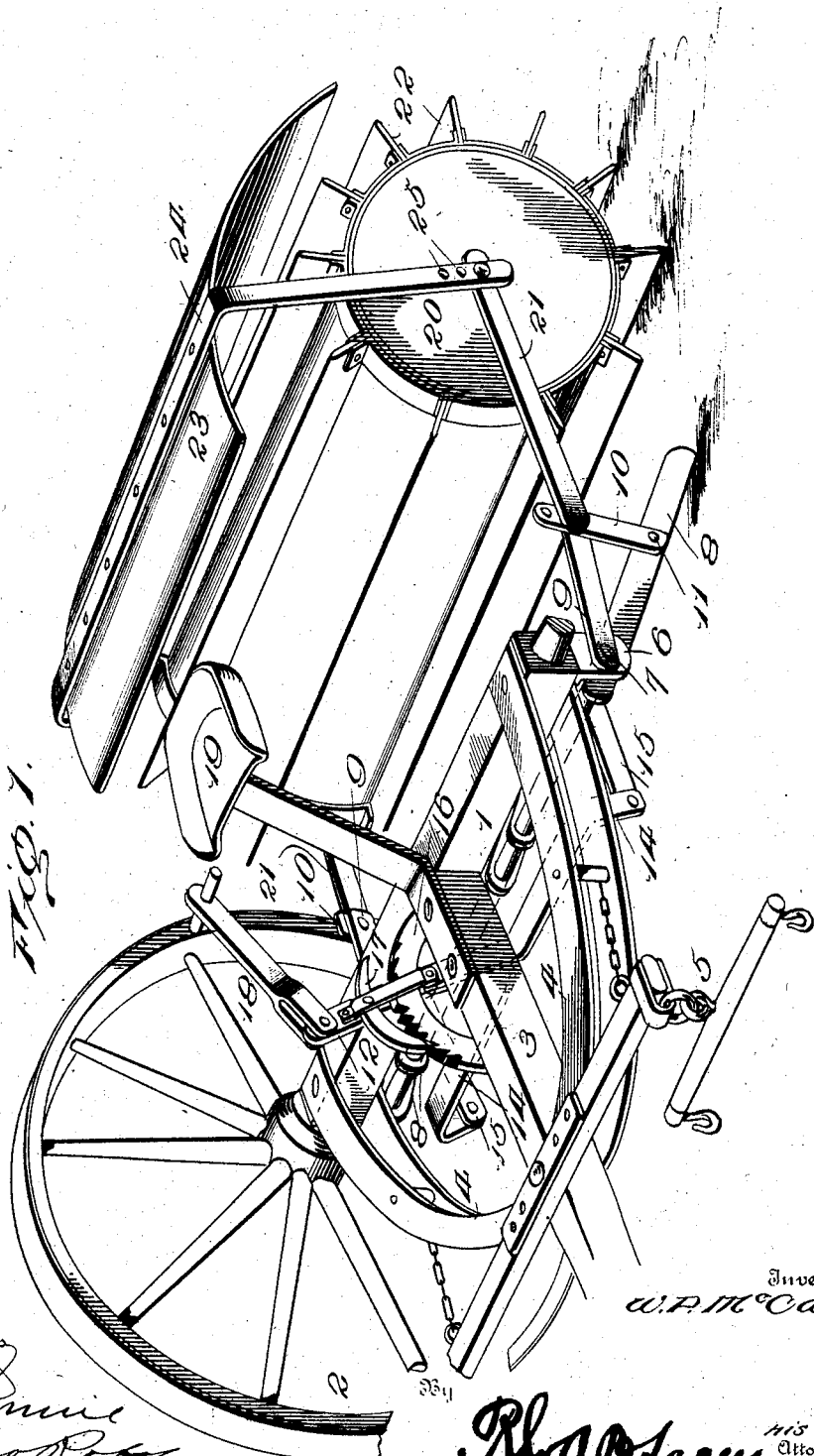

UNITED STATES PATENT OFFICE.

WILLIAM P. McCAIN, OF WILMOT, ARKANSAS.

HARROW.

SPECIFICATION forming part of Letters Patent No. 772,529, dated October 18, 1904.

Application filed March 7, 1904. Serial No. 197,204. (No model.)

*To all whom it may concern:*

Be it known that I, WILLIAM P. McCAIN, a citizen of the United States, residing at Wilmot, in the county of Ashley and State of Arkansas, have invented certain new and useful Improvements in Harrows, of which the following is a specification.

This invention relates to improvements in agricultural implements, and aims to provide a device of this class specially adapted for crushing and reducing the soil preparatory to planting.

The invention specifically embodies a wheeled support adapted to be advanced over the field, a crushing drum or cylinder being connected to the support to reduce the soil, which is first cut into strips by cutting-knives disposed in advance of the said drum or cylinder.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of an implement constructed in accordance with my invention. Fig. 2 is a longitudinal sectional view. Fig. 3 is a transverse sectional view.

Corresponding and like parts are referred to in the following description and indicated in all the views of the drawings by the same reference characters.

In the practical embodiment of the invention the implement comprises a supporting-axle 1, which is mounted upon ground-wheels 2 in any suitable manner. Extending from the axle 1 is a tongue 3, to which the draft-animals are secured, which tongue is held rigidly in place by means of rearwardly-extending hounds 4, such as are commonly employed for this purpose. Whiffletrees 5 are provided for the usual purpose. Supporting members 6 are secured to the under side of the axle 1, adjacent the ground-wheels 2, and the supporting-bar 7 is journaled in the said supporting members 6. A plurality of cutting-knives 8 are secured at intervals upon the supporting-bar 7, and these knives extend rearwardly and downwardly from the supporting-bar, being adapted to enter the earth to cut the soil in longitudinal strips. The cutting-knives 8 are supported by a frame composed of rearwardly-extending arms 9, secured at the front ends thereof to the end portions of the supporting-bar 7, and pendent from the rear end of the arms 9 are supporting members 10. A connecting-bar 11 connects the several cutting-knives 8 together at points between their ends to secure a maximum amount of rigidity of these knives and a uniformity of adjustment.

As will be comprehended from the foregoing description, the knives 8 are adapted for a certain amount of pivotal movement, and special means is provided for securing the knives at an ascertained adjustment to regulate the depth of the cutting action thereof relative to the soil over which the implement passes. The means for adjusting the knives 8 consists of an actuating-lever 12, pivoted to a bracket 13, projected from the supporting-bar 7 and at a point about intermediate the ends of said supporting-bar and adjacent the point of connection of the tongue 3 with the axle 1. The actuating-lever 12 is provided at the lower end thereof with bifurcated portions constituting lateral extensions 14, which extensions are connected by link members 15 to the connecting-bar 11, which is carried by the several supporting-knives. Pivotal movement of the actuating-lever 12 by the operator of the implement will admit of variation in the adjustment in the cutting-knives 8 as desired. The position of the lever 12 is fixed to lock the knives at the ascertained adjustment while cutting, and for this purpose a toothed segment-bar 16 is secured to the upper side of the tongue 3 and a latch-dog 17 is carried by the actuating-lever for engagement with one end of the segment-bar, as will be readily understood. The cutting-knives 8 may be held entirely out of contact with the ground by means of proper manipulation of the operating-lever and engagement of the opposite extremity of the latch-dog 17 with the other end of the segment 16. The teeth of the segment-bar 16 are oppositely inclined from a central point thereof, so that either end of the member 17 may be engaged with the bar for the purpose above set forth. A pivoted handle-bar 18 is connected to the upper end of the actuating-lever 12, and this bar extends rearwardly from the lever 12 to a point adjacent the driver or operator of the implement, who is seated upon a seat 19.

In rear of the cutting-knives 8 is located a revoluble drum or cylinder 20, which is mounted between side bars 21, which are pivotally connected at their forward ends to the rearwardly-extending arms 9 of the cutting-frame. The drum or cylinder 20 is provided with a plurality of transversely-mounted cutting-blades 22, which as the implement advances are adapted to cut the longitudinal strips of earth or turf into small parts, and the drum or cylinder also serves as a means for crushing the earth as it is cut by the knives 9 and the blades 22.

Above the drum or cylinder 20 is disposed a guard 23, which may be secured in this position by any substantial means, such as the U-shaped frame-bar 24. The side portions of the frame-bar 24 may be provided with a plurality of openings 25, whereby the guard may be suitably adjusted to different heights above the drum or cylinder.

The drum or cylinder 20 is flexibly connected to the cutting-frame carrying the cutting-knives 8 by the side bars 21. This is particularly advantageous, since the drum is thus allowed to move independently of the cutting-frame, which is necessary owing to unevenness of the ground over which the implement travels. Because of the pivotal connection of the drum or cylinder the knives 8 are permitted to cut to a certain depth under all conditions of service, and the drum or cylinder may move independently of the position of the knives 8 in the manner before premised.

With reference to the operation of the dog 17 it is preferred that this member shall be balanced upon the operating-lever, and, as before premised, it is adapted to engage at both ends with the segment-bar 16. When the knives 8 are cutting ground, the pressure thereagainst is sufficient to hold the forward end of the dog 17 in engagement with the bar 16. When the knives are out of operative position and above the ground, the weight thereof, with that of the adjacent parts, properly holds the rear end of the dog 17 in engagement with said segment-bar 16.

Having thus described the invention, what is claimed as new is—

In an implement of the class described, the combination of a supporting-axle, a supporting-bar secured to said axle, a plurality of cutting-knives depending from the supporting-bar, rearwardly-extending arms projected from the supporting-bar, a bar connecting the cutting-knives at a point between their ends, connecting means between the connecting-bar aforesaid and the rearwardly-extending arms of the supporting-bar, and a crusher disposed in rear of the cutting-knives and pivotally connected with the rearwardly-extending arms aforesaid.

In testimony whereof I affix my signature in presence of two witnesses.

WILLIAM P. McCAIN. [L. S.]

Witnesses:
 E. O. McDermott,
 M. C. Ford.